US011191250B2

(12) United States Patent
Kerr et al.

(10) Patent No.: US 11,191,250 B2
(45) Date of Patent: Dec. 7, 2021

(54) SCOOP WITH VARIABLY SPACED APART BOTTOM FLANGES

(71) Applicants: Peter Kerr, Seattle, WA (US); Darya Kerr, Seattle, WA (US)

(72) Inventors: Peter Kerr, Seattle, WA (US); Darya Kerr, Seattle, WA (US)

( * ) Notice: Subject to any disclaimer, the term of this patent is extended or adjusted under 35 U.S.C. 154(b) by 0 days.

(21) Appl. No.: 17/352,967

(22) Filed: Jun. 21, 2021

(65) Prior Publication Data

US 2021/0307287 A1 Oct. 7, 2021

(51) Int. Cl.
*B07B 1/02* (2006.01)
*A01K 1/01* (2006.01)
*B07B 1/12* (2006.01)

(52) U.S. Cl.
CPC .............. *A01K 1/0114* (2013.01); *B07B 1/02* (2013.01); *B07B 1/12* (2013.01)

(58) Field of Classification Search
CPC ............ A01K 1/0114; B07B 1/02; B07B 1/12
USPC ............................ 209/418, 419; 294/1.3, 179
See application file for complete search history.

(56) References Cited

U.S. PATENT DOCUMENTS

| | | | | |
|---|---|---|---|---|
| 6,312,029 | B1 * | 11/2001 | Renforth | A01K 1/0114 209/418 |
| 6,416,097 | B1 * | 7/2002 | O'Rourke | A01K 1/0114 209/418 |
| 8,356,845 | B2 * | 1/2013 | Bernard | A01K 1/0114 294/1.3 |
| D679,876 | S * | 4/2013 | Teren | D30/162 |
| 8,662,548 | B1 * | 3/2014 | Viani | A01B 1/02 294/51 |
| D841,904 | S * | 2/2019 | Wirth | D30/162 |
| 2004/0090073 | A1 * | 5/2004 | Edwards | E01H 1/1206 294/1.3 |
| 2007/0267333 | A1 * | 11/2007 | Delman | B07B 1/02 209/418 |
| 2011/0011779 | A1 * | 1/2011 | Riccardi | A01K 1/0114 209/614 |
| 2013/0140220 | A1 * | 6/2013 | Knittel | A01K 1/01 209/419 |
| 2017/0150675 | A1 * | 6/2017 | Schultz | A01D 7/06 |

* cited by examiner

*Primary Examiner* — Joseph C Rodriguez
(74) *Attorney, Agent, or Firm* — Michael J. Feigin, Esq.; Feigin and Fridman LLC

(57) ABSTRACT

A scoop has a handle and curvilinear base such that the scoop is narrower at an extreme end and deeper at a back end, the back end meeting a handle. A front most region of the device meets the top side of the device in some embodiments, such that side walls, the top side, and the bottom side join at a front end. The bottom side of the base has a plurality of spaced apart slats with portals therebetween. The slats are closer together near the front side than the back side, becoming progressively more spaced apart. In this manner, a smallest size particulate matter falls through the slats at the front end of the device while progressively larger particulate matter falls through towards the back end of the device in proportion to the increasing space between the slats.

18 Claims, 7 Drawing Sheets

SCOOP WITH VARIABLY SPACED APART BOTTOM FLANGES

FIELD OF THE DISCLOSED TECHNOLOGY

The disclosed technology relates generally to scoops and more specifically to a scoop with spaced apart bottom flanges or slats.

SUMMARY OF THE DISCLOSED TECHNOLOGY

A scoop (a device designed to pick up particulate matter having at least some bottom wall, at least some side walls, at least a partially or fully closed back wall, and an open or mostly open front end) is disclosed herein. The scoop has a length extending in a direction from an extreme end of a handle to a front end (an extreme opposite end of the scoop relative to the handle). A width is perpendicularly disposed relative to the length, The scoop has a handle extending to an outer rim (side and/or back wall of the scoop). The scoop further has an inner base joined to, and at least partially surrounded by, the outer rim. The inner base has a plurality of spaced apart slats. A distance between each two slats of the plurality of spaced apart slats is unique, relative to each other, from each other distance between two spaced apart slats of the plurality thereof. The distance between each two slats of the plurality of slats is greatest between two slates of the plurality of slats which are nearest to the handle in embodiments of the disclosed technology, while a distance between two slates which are nearest to said extreme opposition end of the scoop is least. That is, the slats are closer to together to each other near the front side (open end/side furthest from the handle) and furthest apart nearest to the back side (and handle) of the scoop. The distance between the slats can progressively increase/decrease, in order.

As such, such a scoop is adapted such that dipping the scoop (starting with the extreme opposite end of the scoop towards the handle) into heterogeneously sized particulate matter causes smaller pieces of the heterogeneously sized particulate matter to fall between the plurality of spaced apart slats before larger pieces of the heterogeneously sized particulate matter fall through the wider spaced apart slats nearest to the back end of the scoop.

The area (the space inside a boundary according to the mathematical definition, in this case based on a top plan view looking downwards towards the scoop) of each portal between each two slats of the plurality of slats is unique in embodiments of the disclosed technology. This area can progressively increase when moving from an entree end/tip of the scoop portion towards the back end of the scoop/ towards the handle.

The outer rim can have a greatest depth where joining with the handle and a least depth where joining with the extreme opposite end of the scoop. The depth is defined as a direction perpendicular to each of the aforementioned length and width and/or defined as a distance from a horizontal plane passing vertically along a top-side of a scoop and/or a horizontal plane of a paper showing a top plan view of the scoop. The outer rim depth decreases proportionate to the distance between each two slats in a same cardinal direction thereto in embodiments of the disclosed technology.

The base can be curvilinear at a bottom side thereof and/or parabolic shaped. The spaced apart slats have a different depth than each other slat of said spaced apart slats in such an embodiment, as the slats lie along and/or form the bottom side of the scoop.

Described another way, a scoop has a scooping end with a curvilinear base and a handle attached to an end opposite the scooping end. A plurality of spaced apart flanges form the curvilinear base, each having a different distance, in a vertical plane, from a bottom most extent of the scoop and/or from each other. Each flange of the plurality of spaced apart flanges can also be at a different horizontal position relative to each other, the horizontal being perpendicular to said vertical plane. Each flange of the plurality of spaced apart flanges is parallel to one another in some embodiments, in one direction in a single plane, such as only in one plane. A distance between each two flanges of the plurality of spaced apart flanges is different than a distance between each other two flanges of the plurality of spaced apart flanges in this plane or other planes.

The distance between each two flanges of the plurality of spaced apart flanges is least, furthest away from the bottom most extent of the scoop and most, closest to the bottom most extent of the scoop. The flanges closest to the bottom most extent of the scoop are those closest to the handle. The "bottom most extent" refers to the greatest distance from a top edge of the outer rim and/or furthest from a horizontal plane passing through a paper showing a top plan view of the scoop.

The scoop is adapted to pass only smaller particulate matter between each two flanges of said plurality of spaced apart flanges furthest away from said bottom most extent of said scoop compared to between each other two flanges of the plurality of spaced apart flanges. The scoop is further adapted to successively pass larger particulate matter between each two flanges of the plurality of spaced apart flanges, in order, when the particulate matter is scooped across in a direction from a top most extent of the scoop towards a bottom most extent of the scoop, the top most extent being a furthest extent from the bottom most extent in the vertical plane.

"Vertical extent" is defined as "a portion which has a vertical length throughout which its cross-sections are substantially identical".

The directional descriptors used in this disclosure, such as "top", "bottom", "vertical", "horizontal", "upper", "lower", "above", and "below" are relative to a typical direction of use.

Any device or step to a method described in this disclosure can comprise, or consist of, that which it is a part of, or the parts which make up the device or step. The term "and/or" is inclusive of the items which it joins linguistically and each item by itself. Any element or described portion of the devices shown can be "substantially" as such, if used in the claims in this manner. Where used, "substantially" is defined as "within a 5% tolerance level thereof."

DETAILED DESCRIPTION OF EMBODIMENTS OF THE DISCLOSED TECHNOLOGY

A scoop has a handle connecting to a working end, the working end having a scoop with a base opposite a top side. The base is curvilinear such that the scoop is narrower at an extreme end and deeper at a back end, the back end meeting a handle. The narrow end, at a front most region of the device, meets the top side of the device in some embodiments, such that side walls defining an area between a top and bottom side of the scoop ends, the top and bottom side joining together as one at the front end. The bottom side (curvilinear side) of the base has a plurality of spaced apart slats with portals therebetween. The slats are closer together near the front side than the back side, becoming progressively more spaced apart. In this manner, a smallest size particulate matter falls through the slats at the front end of the device while progressively larger particulate matter falls through towards the back end of the device in proportion to the increasing space between the slats.

The technology will become clearer in view of the following description of the figures.

Figure 1:
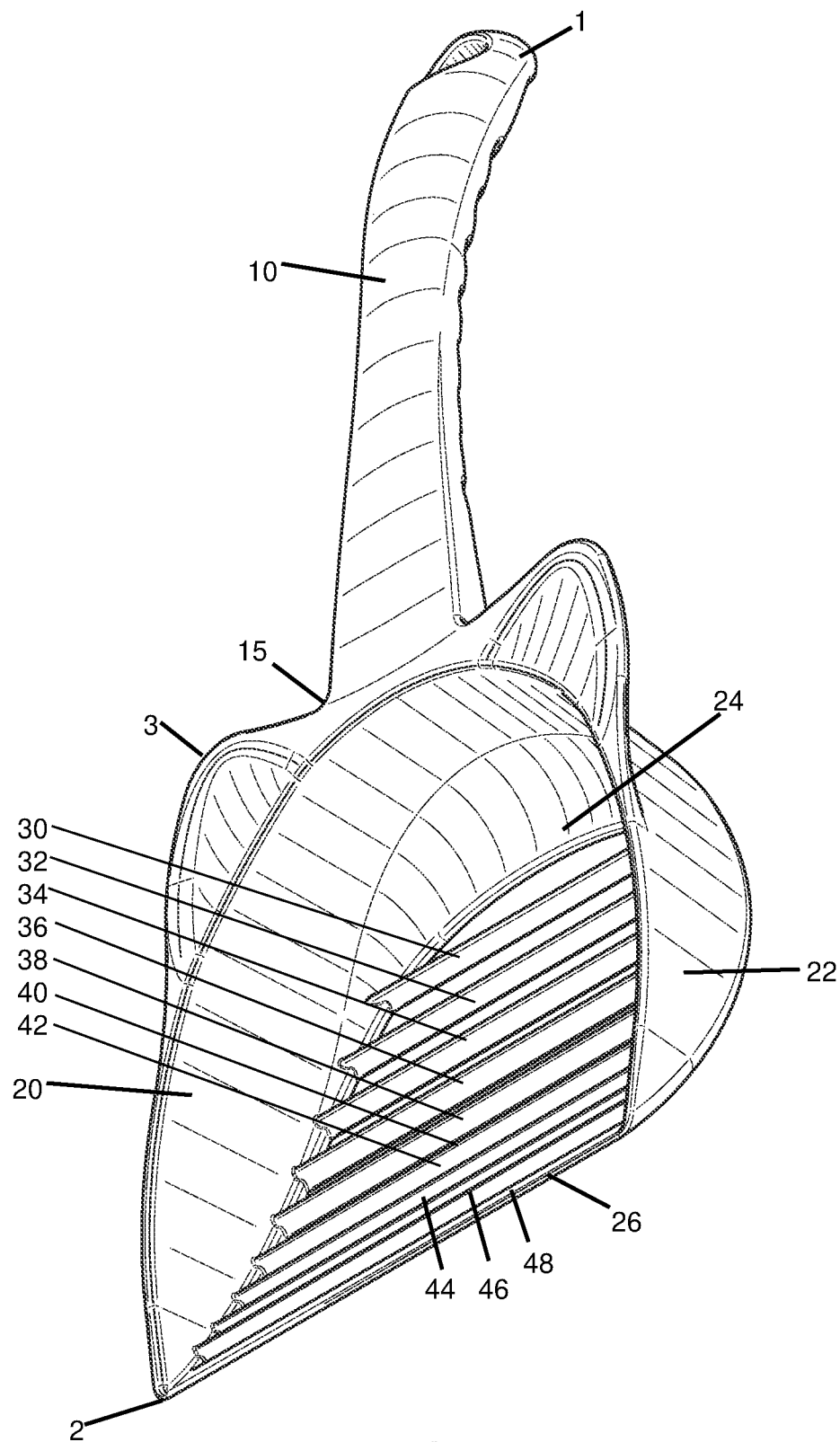
FIG. 1 shows a top perspective view of a scoop.
Figure 2:
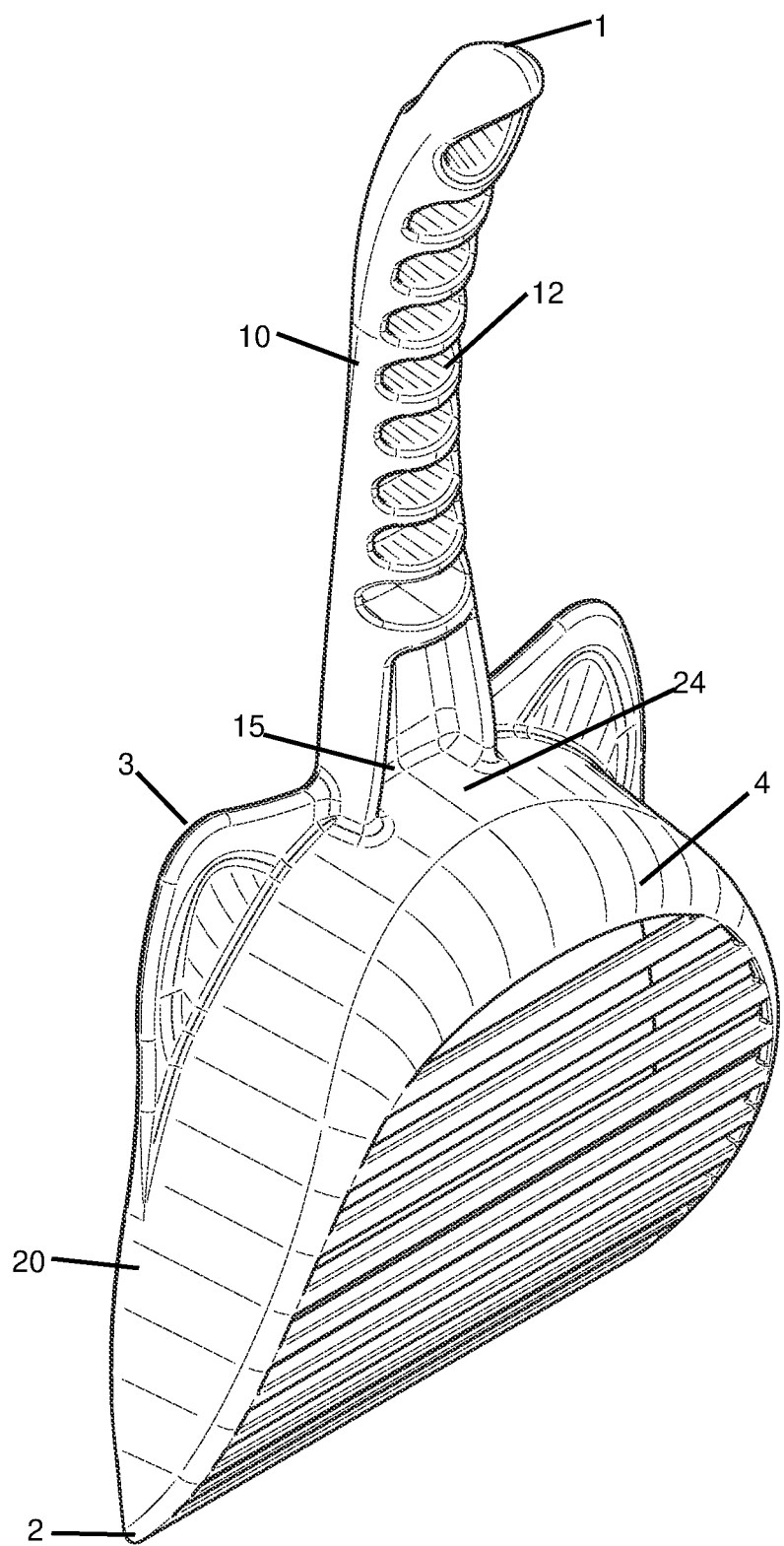
FIG. 2 shows a bottom perspective view thereof.
Figure 3:
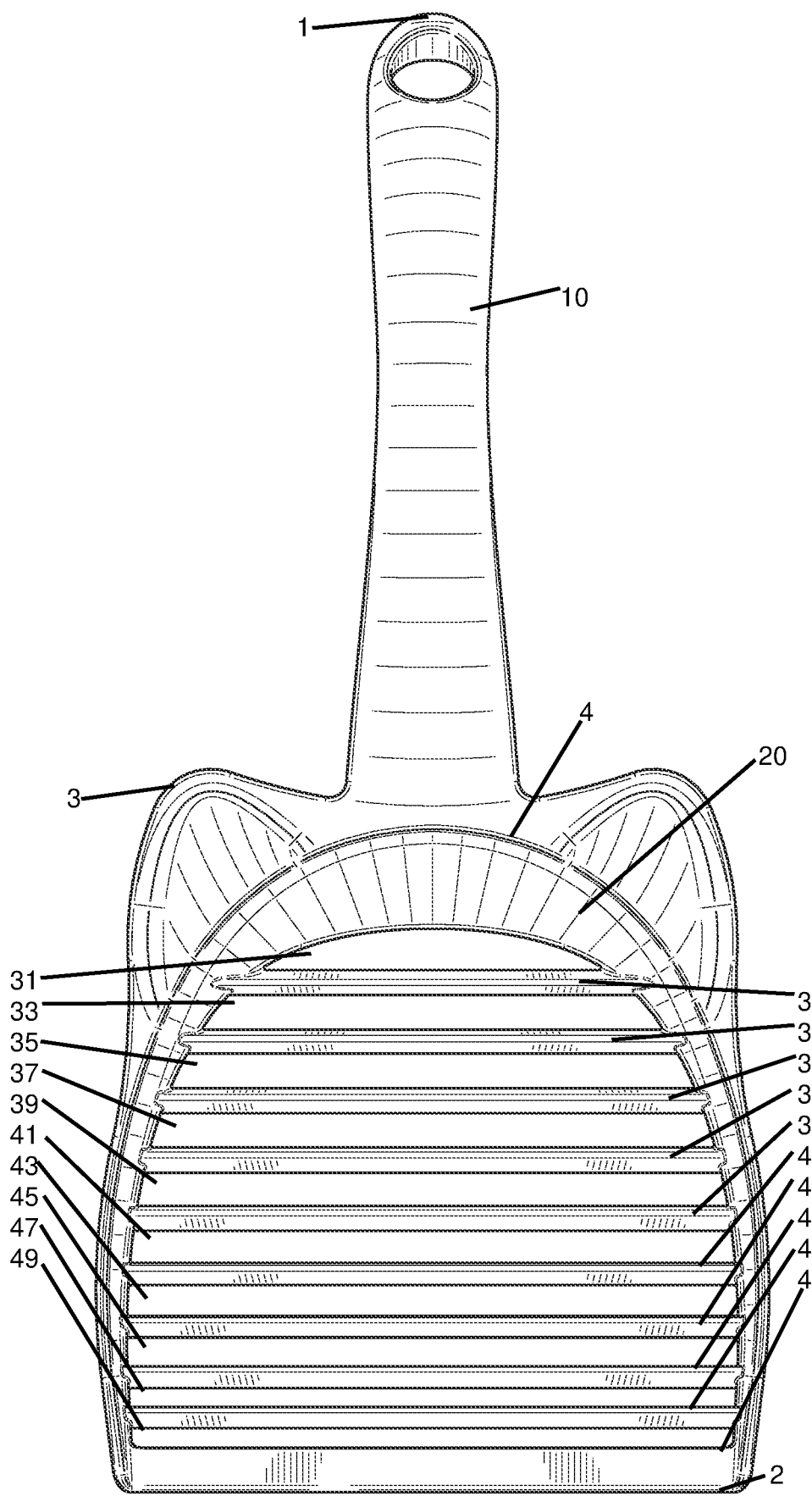
FIG. 3 shows a top plan view thereof.
Figure 4:
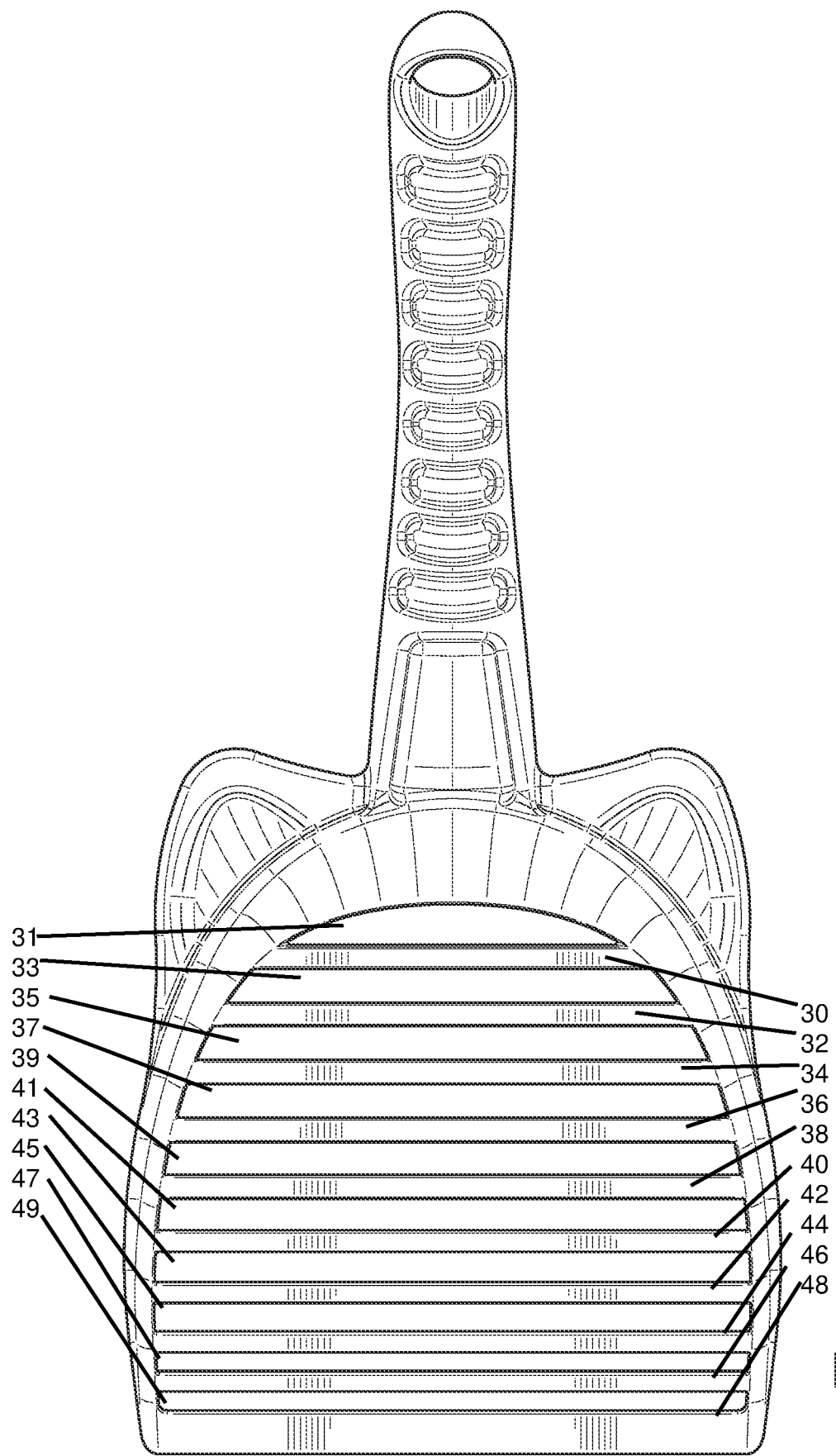
FIG. 4 shows a bottom plan view thereof.
Figure 5:
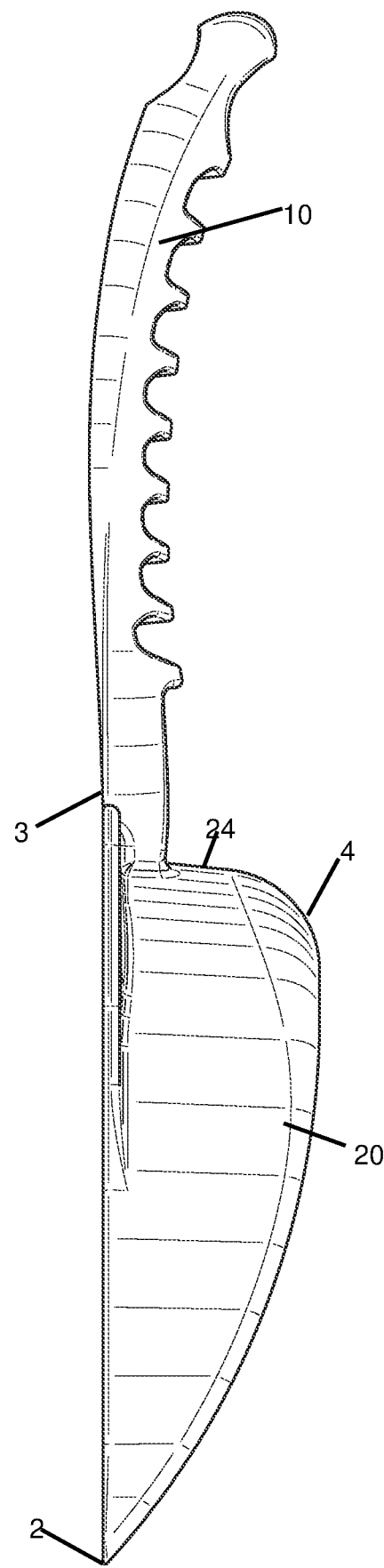
FIG. 5 shows a side elevation view thereof, the reverse side being a mirror image thereof.
Figure 6:
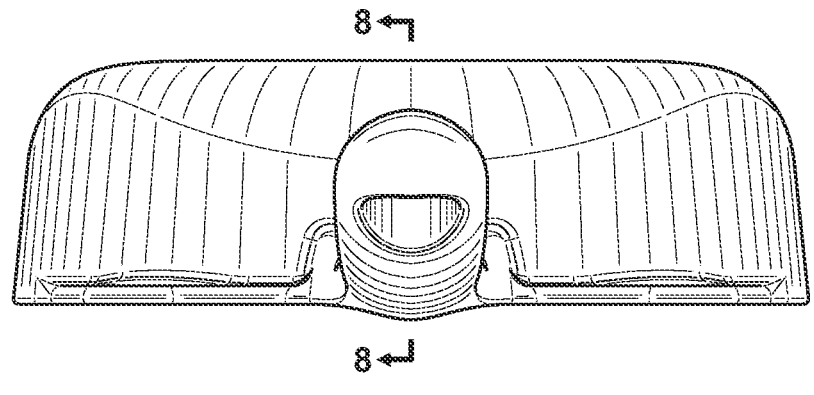
FIG. 6 shows a rear side view thereof.
Figure 7:
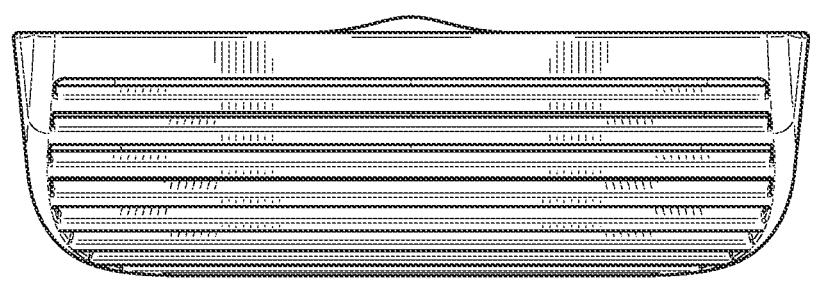
FIG. 7 shows a front side view thereof.
Figure 8:
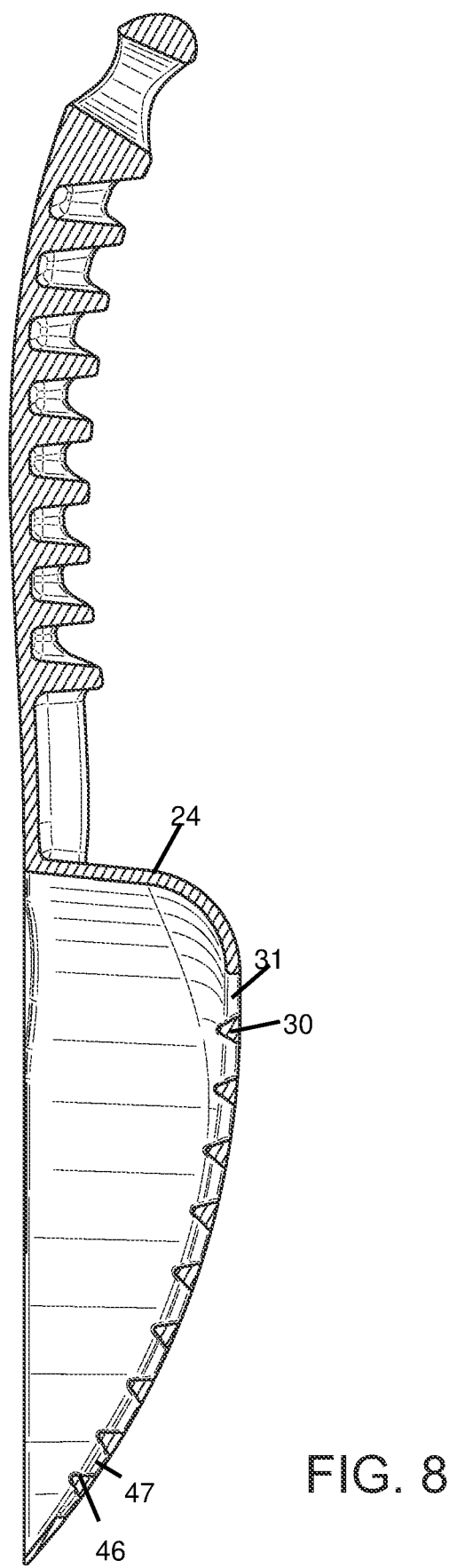
FIG. 8 shows a side cutaway view along section line 8-8 of FIG. 6.

Discussing all the figures together, FIG. 1 shows a top perspective view of a scoop. FIG. 2 shows a bottom perspective view thereof. FIG. 3 shows a top plan view thereof. FIG. 4 shows a bottom plan view thereof. FIG. 5 shows a side elevation view thereof, the reverse side being a mirror image thereof. FIG. 6 shows a rear side view thereof. FIG. 7 shows a front side view thereof. FIG. 8 shows a side cutaway view along section line 8-8 of FIG. 6.

The scoop has an extreme back end 1 at the edge of a handle 10. A horizontal plane, for purposes of description and claims, passes along a top side of the scoop 20 and through at least part of the handle until reaching a position at, or above, the extreme end 1 of the handle 10. The handle 10 is connected at junction 15 which is a fixed/unitary connection or removable connection between the handle 10 and a scoop 20.

The scoop 20 has a front edge 26, side walls 22, and a back side 24. A front edge 2 of the device is also a front edge 26 of the scoop 20 portion thereof. The front edge 2 is furthest from the back end 1 in the afore-described horizontal plane when viewed in a top plan view (e.g. without regard to a vertical position of the extreme ends relative to one another). The bottom of the scoop (see FIGS. 2 and 8) is curvilinear with a plurality of slats and spaces between the slats. Further, in the bottom view one can see the bottom most extent 4 of the device which is at a back end 24 of the scoop 20. This is the "deepest" point which is opposite a top side, the top most extent 3 being the furthest in a vertical plane from the bottom most extent (without regard to horizontal position). The vertical plane and horizontal plane are perpendicular to each other.

Referring still to the bottom side of the scoop 20, the slates are of equal width in embodiments of the disclosed technology, however, the spacing between slats progressively increases towards the back side 24. That is, the spaces between the slats are smallest near the front side 26, and largest near the back side 24 (the distances being distances in the horizontal plane, as described herein and used for purposes of the claim language). While the slats themselves are the same width in embodiments of the disclosed technology, the spacing between the slats changes.

As seen in FIG. 3, a top plan view, the slats (or flanges), from back side to front side, 30, 32, 34, 36, 38, 40, 42, 44, 46, and 48 are surrounded by and/or between portals (spaced apart regions) 31, 33, 35, 37, 39, 41, 43, 45, 47, and 49. Any number of slats/flanges and spaces therebetween can be used. The spacing between slats increases from the front 2 of the scoop to the back 20 of the scoop. As such, the space 49 is thinner than the space 47 which is thinner than the space 45, the pattern continuing all the way until the widest space 31. In this embodiment, the width of each slat 30 to 48 (each incremented by 2) is identical though the width of spacing changes in the X-axis. At the same time, in embodiments of the disclosed technology, the Y-axis of each slot changes as well in order to allow a more effective scooping since when can place the tip of the parabolic bottom side of the scoop (the bottom side formed by the combination of slats/flanges and spaces there-between).

When one scoops particulate matter of various sizes, one dips the tip 26 of the scoop in the particulate matter, pushing the scoop further in and placing the matter within the bottom and side walls of the scoop. Turning the scoop upwards, so that gravity is normal to the horizontal slats/flanges causes the particulate matter to fall towards and through the slats. The smaller the particulate matter, the more slats the matter can fit between. Thus, as one dips the smallest particles fall through the front end slats/flanges while larger particles are separated out therefrom. Depending on how large of particles of substances one is trying to separate or pickup, more of the scoops is dipped in. For example, when trying to separate cat waste from kitty litter, the litter will fall between the slats while the waste will remain in the slats. If one wishes to separate larger particles than kitty litter, such as small pebbles, from larger pebbles, the same method can be used though with slats further back relative to the first example. For purposes of this disclosure, "particulate matter" is any "separate and numerous pieces able to fit through at least two flanges and/or a bottom side of a scoop of the disclosed technology."

The scoop has side walls 22 which connect and/or meet and/or form a unitary structure with the bottom side of the scoop. The side walls 22, in embodiments of the disclosed technology, have a top side which is continuously and fully in a same horizontal plane while the bottom side parabolically or increasingly becomes longer from a front end 26 of the scoop 20 to a back end 24 of the scoop. In this manner, the scoop is deeper near the back side 24 than a front side 26.

The handle 10 can have ribbing 12 to correspond to and/or give a feel similar to that of the scoop as a visual or tactile indicator to a user thereof. The ribbing also allows for less use of material. The entire scoop with handle can be formed as a unitary structure, such as by injection molding, or from a plurality of parts attached together.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalence of the claims are to be embraced within their scope. Combinations of any of the methods, systems, and devices described herein-above are also contemplated and within the scope of the disclosed technology.

The invention claimed is:

1. A scoop having a length extending in a direction from an extreme end of a handle to an extreme opposite end of a scoop, and a width perpendicularly disposed relative to said length, said scoop comprising:
   said handle extending to an outer rim of said scoop;
   said scoop further comprising an inner base joined to and at least partially surrounded by said outer rim;
   said inner base comprising a plurality of spaced apart slats;
   wherein a distance between each two slats of said plurality of spaced apart slats is unique from each other distance between two spaced apart slats of said plurality of spaced apart slats.

2. The scoop of claim 1, wherein said distance between each two slats of said plurality of slats is greatest between two slates of said plurality of slats which are nearest to said handle.

3. The scoop of claim 2, wherein said distance between each two slats of said plurality of slats is least between two slates of said plurality of slats which are nearest to said extreme opposition end of said scoop.

4. The scoop of claim 3, wherein said scoop is adapted such that dipping said scoop, starting with said extreme opposite end of said scoop towards said handle, into heterogeneously sized particulate matter causes smaller pieces of said heterogeneously sized particulate matter to fall between said plurality of spaced apart slats before larger pieces of said heterogeneously sized particulate matter.

5. The scoop of claim 3, wherein each mathematical area of each portal between each two slats of said plurality of slats is unique.

6. The scoop of claim 2, wherein said outer rim has a greatest depth where joining with said handle and a least depth where joining with said extreme opposite end of said scoop, wherein said depth is defined as a direction perpendicular to each of said length and said width.

7. The scoop of claim 1, wherein said outer rim depth decreases proportionate to said distance between each two slats in a same cardinal direction thereto.

8. The scoop of claim 2, wherein said base is parabolic shaped.

9. The scoop of claim 8, wherein said spaced apart slats are progressively further from each other in an inverse proportion to a distance from said handle along a horizontal plane.

10. The scoop of claim 9, wherein said spaced apart slats have a different depth than each other slat of said spaced apart slats.

11. A scoop comprising:
    a scooping end with a curvilinear base;
    a plurality of spaced apart flanges forming said curvilinear base, each having a different distance, in a vertical plane, from a bottom most extent of said scoop.

12. The scoop of claim 11 wherein each flange of said plurality of spaced apart flanges is at a different horizontal position relative to each other, said horizontal being perpendicular to said vertical plane.

13. The scoop of claim 12, wherein each said flange of said plurality of spaced apart flanges is parallel to one another.

14. The scoop of claim 13, wherein a distance between each two flanges of said plurality of spaced apart flanges is different than a distance between each other two flanges of said plurality of spaced apart flanges.

15. The scoop of claim 14, wherein said distance between each two flanges of said plurality of spaced apart flanges is least, furthest away from said bottom most extent of said scoop.

16. The scoop of claim 15, wherein said distance between each two flanges of said plurality of spaced apart flanges is greatest, closest to said bottom most extent of said scoop.

17. The scoop of claim 16, wherein said scoop is adapted to pass only smaller particulate matter between each two flanges of said plurality of spaced apart flanges furthest away from said bottom most extent of said scoop, compared to between each other two flanges of said plurality of spaced apart flanges.

18. The scoop of claim 16, wherein said scoop is adapted to successively pass larger particulate matter between each two flanges of said plurality of spaced apart flanges, in order, when said particulate matter is scooped across in a direction from a top most extent of said scoop towards a bottom most extent of said scoop, said top most extent being a furthest extent from said bottom most extent in said vertical plane.

* * * * *